US012155147B2

(12) United States Patent
Bae

(10) Patent No.: US 12,155,147 B2
(45) Date of Patent: Nov. 26, 2024

(54) CONNECTOR ASSEMBLY FOR VIDEO TRANSMISSION CABLE

(71) Applicants: Hyundai Motor Company, Seoul (KR); Kia Corporation, Seoul (KR)

(72) Inventor: Jae Cheol Bae, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 346 days.

(21) Appl. No.: 17/898,023

(22) Filed: Aug. 29, 2022

(65) Prior Publication Data

US 2023/0064534 A1 Mar. 2, 2023

(30) Foreign Application Priority Data

Sep. 2, 2021 (KR) ........................ 10-2021-0116708

(51) Int. Cl.
*H01R 13/502* (2006.01)
*H01R 13/04* (2006.01)
*H01R 13/10* (2006.01)

(52) U.S. Cl.
CPC ........... *H01R 13/502* (2013.01); *H01R 13/04* (2013.01); *H01R 13/10* (2013.01)

(58) Field of Classification Search
CPC ....... H01R 13/502; H01R 24/38; H01R 24/40
See application file for complete search history.

(56) References Cited

U.S. PATENT DOCUMENTS 3,277,424 A * 10/1966 Nelson ................. H01R 13/523 439/205
4,258,076 A * 3/1981 Watanabe ............ H01R 13/533 427/105
4,998,894 A * 3/1991 Gronvall ............ H01R 13/5216 439/936
5,123,721 A * 6/1992 Seo ...................... G11B 33/124
5,362,250 A * 11/1994 McMills ............ H01R 13/5216 439/387
6,464,543 B2 * 10/2002 Suzuki ................... H01R 43/18 439/736
6,602,088 B1 * 8/2003 Zhu .................... H01R 13/6593 439/732
6,918,800 B2 * 7/2005 Ota ........................ H01R 13/03 439/886
7,481,665 B2 * 1/2009 Hiramatsu ........... H01R 13/639 439/352
7,537,475 B2 * 5/2009 Wise ...................... H01R 13/62 439/936

* cited by examiner

*Primary Examiner* — Neil Abrams
(74) *Attorney, Agent, or Firm* — Morgan, Lewis & Bockius LLP

(57) ABSTRACT

A connector assembly for a video transmission cable is configured to completely eliminate a clearance between connectors when a first connector and a second connector are fastened, maintaining a contact state of connector terminals even under conditions of vibration or shock.

11 Claims, 4 Drawing Sheets

[ A-A Cross section ]

[ B-B Cross section ]

[ C-C Cross section ]

CONNECTOR ASSEMBLY FOR VIDEO TRANSMISSION CABLE

CROSS REFERENCE TO RELATED APPLICATION

The present application claims priority to Korean Patent Application No. 10-2021-0116708, filed Sep. 2, 2021, the entire contents of which is incorporated herein for all purposes by this reference.

BACKGROUND OF THE PRESENT DISCLOSURE

Field of the Present Disclosure

The present disclosure relates generally to a connector assembly for a video transmission cable, and more particularly, to a connector assembly for a video transmission cable capable of securing fastening robustness of connectors even when vibration and shock of a vehicle occur.

Description of Related Art

In general, an image transmission cable applied to a vehicle is connected to an image receiver through a connector assembly. The connector assembly requires a clearance between a connector sleeve and a connector housing for easy fastening without interference of connector terminals when connectors are fastened.

FIG. 6 is a view showing a state before fastening of a connector assembly for a video transmission cable of a related art, and FIG. 7 is a view showing a state after fastening of the connector assembly.

As shown in FIG. 6 and FIG. 7, the conventional connector assembly for a video transmission cable includes a first connector 10 and a second connector 20. The first connector 10 includes a connector sleeve 11 and a first connector terminal 12 provided in the connector sleeve 11, and the second connector 20 includes a connector housing 21 and the connector 22 provided in the housing 21. Furthermore, the first connector 10 is provided with a connector cable 13 (that is, an image transmission cable) connected to the first connector terminal 12.

In the connector assembly, there is a clearance between the connector sleeve 11 and the connector housing 21 for easy fastening of the connectors 10 and 20.

Such a clearance causes poor contact between the second connector terminal 22 and the first connector terminal 12 and an error in image signal transmission due to the poor contact when the vehicle vibrates. The present image signal transmission error causes problems such as a black screen phenomenon and the like in which an image is not output to the monitor in the vehicle.

For example, when a bad contact occurs between the connector terminals of an image transmission cable for a camera due to the impact when a vehicle accident occurs, a fatal problem in which an image at the moment of the vehicle accident is not recorded may occur.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a connector assembly for a video transmission cable which is configured to completely eliminate a clearance between connectors when a first connector and a second connector are fastened, maintaining a contact state of connector terminals even under conditions of vibration or shock.

The objective of the present disclosure is not limited to the objective mentioned above, and other objectives of the present disclosure not mentioned will be clearly understood by those of ordinary skill in the art to which the present disclosure belongs from the following description.

In various aspects of the present disclosure, there may be provided a connector assembly for a video transmission cable, the connector assembly including: a first connector provided with a connector sleeve, a first connector terminal provided inside the connector sleeve, and a non-conductive film layer coated on an external circumferential surface of the connector sleeve; and a second connector provided with a connector housing into which the connector sleeve is configured to be inserted, a second connector terminal provided inside the connector housing to come into contact with the first connector terminal, and a film layer pusher protrudingly formed on an internal circumferential surface of the connector housing, wherein, when the connector sleeve is inserted into the connector housing, a portion of the non-conductive film layer is separated from an external circumferential surface of the connector sleeve by the film layer pusher, filling a first void space of a space formed between the connector sleeve and the connector housing.

According to an exemplary embodiment of the present disclosure, the film layer pusher may be provided at a middle portion of the connector housing in an axial direction of the connector housing, extending with a predetermined thickness in a circumferential direction of the connector housing.

Furthermore, the first void space may be a space between an opening portion of the connector housing and the film layer pusher.

Furthermore, the film layer pusher may have an internal diameter smaller than an external diameter of the non-conductive film layer.

Furthermore, the space may include a second void space in an axial direction of the connector housing, and an end portion of the connector sleeve may be positioned in the second void space when the connector sleeve is inserted into the connector housing.

Furthermore, when the connector sleeve is inserted into the connector housing, the end portion of the connector sleeve may be positioned in the second void space by passing the first void space and the film layer pusher in sequence.

Furthermore, the first void space, the film layer pusher and the second void space may be provided in series in an axial direction of the connector housing from an opening portion of the connector housing.

Furthermore, the connector sleeve may be provided with a film layer stopper at a rear end portion thereof; and when a portion of the non-conductive film layer is separated from an external circumferential surface of the connector sleeve by the film layer pusher, the film layer stopper may close the first void space at a side facing the film layer pusher.

Furthermore, the film layer stopper may have an external diameter greater than an internal diameter of the connector housing.

Furthermore, the film layer stopper may be formed to have an external diameter greater than an external diameter of the connector sleeve, protruding outward in a radial direction of the connector sleeve.

Furthermore, the first connector may include a connector cable configured to transmit an image signal to the first connector terminal.

As described above, the present disclosure provides that the clearance between the connector housing and the connector sleeve is eliminated by completely filling a first void space with a non-conductive film layer when the first connector and the second connector are fastened to each other. Accordingly, the fastening robustness of the connector assembly may be increased, and the contact state of the connector terminals may be stably maintained even when vibration and shock of a vehicle occur, preventing a transmission error of an image signal due to poor contact between the connector terminals.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
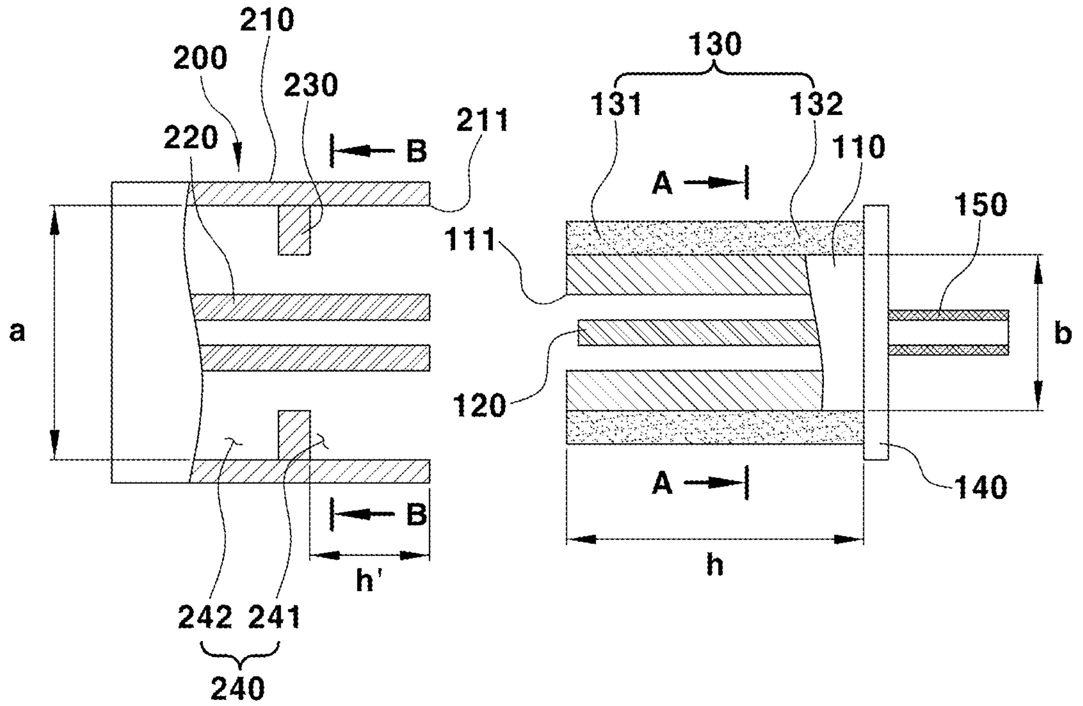
FIG. 1 is a view showing a state before fastening of a connector assembly for an image transmission cable according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present disclosure are only exemplified for describing embodiments according to the concept of the present disclosure, and the exemplary embodiments according to the concept of the present disclosure may be implemented in various forms. Furthermore, the present disclosure should not be construed as being limited to the exemplary embodiments described herein and should be understood to include all modifications, equivalents, and substitutes included in the spirit and scope of the present disclosure.

In addition, throughout the present specification, when a part "includes" a certain component, this means that other components may be further included rather than being excluded, unless specifically contrarily stated.

In addition, in the present specification, the division of names of components into "first", "second", and the like is only for distinguishing components having the same name and does not limit the order.

Hereinafter, various embodiments of the present disclosure will be described with reference to the accompanying drawings. Matters expressed in the accompanying drawings are schematically drawn in the drawings for easy explanation of the exemplary embodiments of the present disclosure and may be different from the forms actually implemented.

Figure 2:
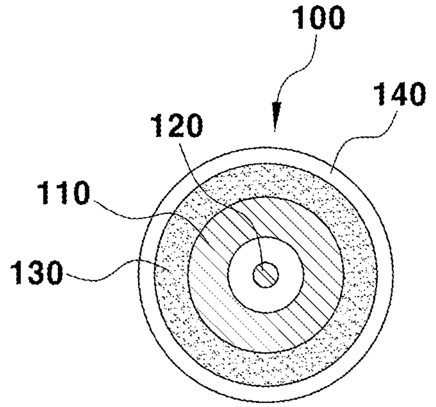
FIG. 2 is a view taken along line A-A of FIG. 1.
Figure 3:
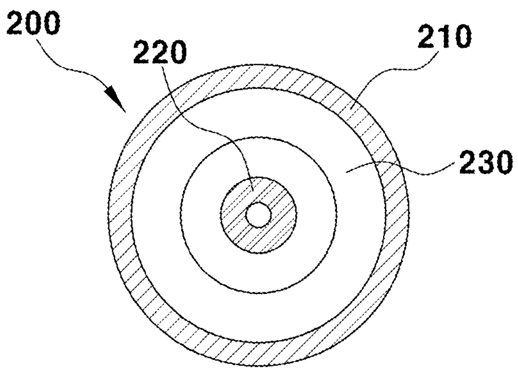
FIG. 3 is a view taken from B-B of FIG. 1.
Figure 4:
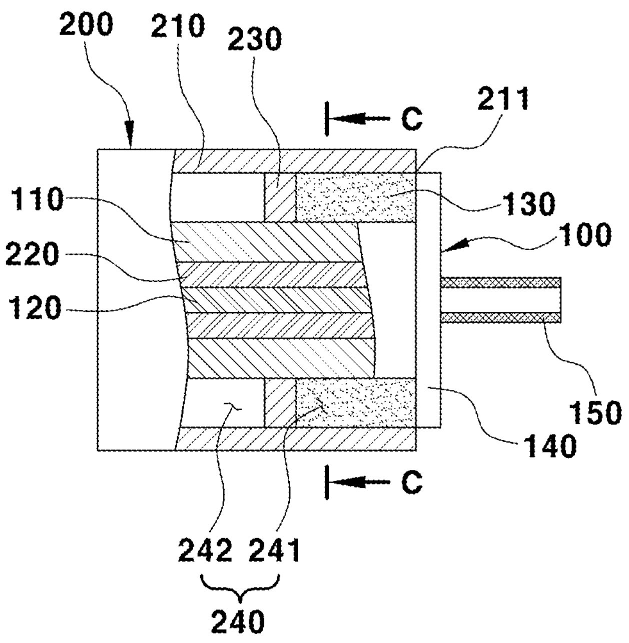
FIG. 4 is a view showing a state after fastening of the connector assembly for a video transmission cable according to the exemplary embodiment of the present disclosure.
Figure 5:
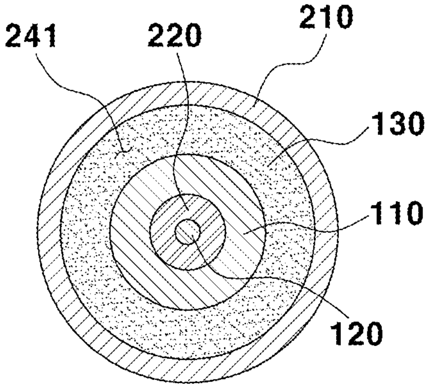
FIG. 5 is a view taken along line C-C of FIG. 4.
Figure 6:
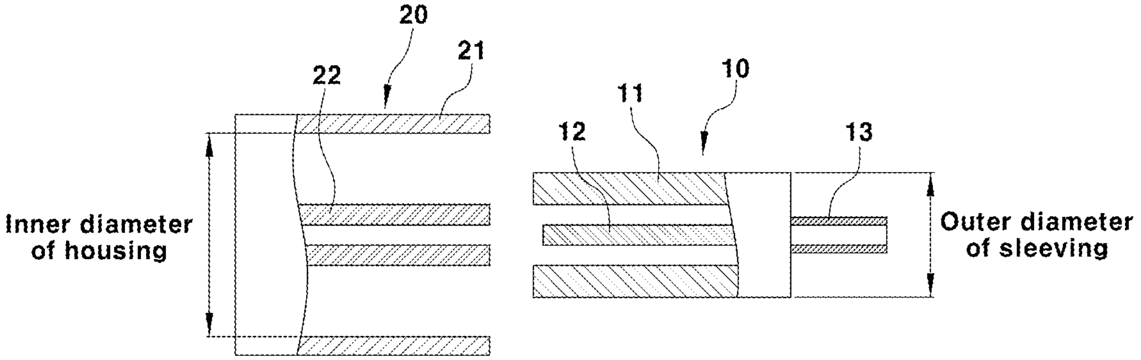
FIG. 6 is a view showing a state before fastening of a connector assembly for a video transmission cable of a related art.
Figure 7:
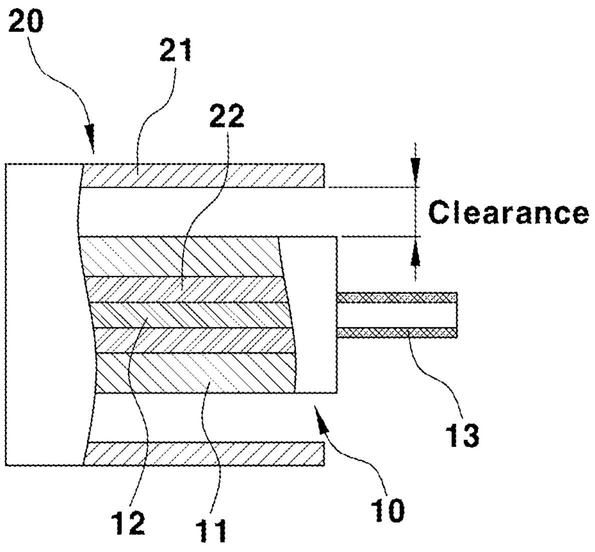
FIG. 7 is a view showing a state after fastening of the connector assembly for a video transmission cable of the related art.

Accompanied FIG. 1 is a view showing a state before fastening of a connector assembly for an image transmission cable according to an exemplary embodiment of the present disclosure, FIG. 2 is a view taken along line A-A of FIG. 1, FIG. 3 is a view taken from B-B of FIG. 1, FIG. 4 is a view showing a state after the fastening of the connector assembly for a video transmission cable according to the exemplary embodiment of the present disclosure, and FIG. 5 is a view taken along line C-C of FIG. 4.

As shown in FIG. 1, the connector assembly of the present disclosure includes a first connector 100 and a second connector 200.

As shown in FIG. 1 and FIG. 2, the first connector 100 includes a connector sleeve 110, a first connector terminal 120, a non-conductive film layer 130, a film layer stopper 140, and a connector cable 150.

The connector sleeve 110 may be formed in a shape of cylinder including one end portion open and an opposite end portion closed. With a longitudinal direction of the first connector terminal 120 as a reference, the one end portion of the connector sleeve 110 is open. The connector sleeve 110 has a first opening portion 111 at the one end portion thereof for insertion of a second connector terminal 220. To fasten the first connector 100 and the second connector 200 to each other, the connector sleeve 110 is inserted into a connector housing 210 of the second connector 200.

The first connector terminal 120 is provided inside the connector sleeve 110. The first connector terminal 120 is provided inside the connector sleeve 110 in a state in which one end portion thereof is fixed to the connector sleeve 110. The first connector terminal 120 extends long in an axial direction of the connector sleeve 110. The first connector terminal 120 may be provided in a center portion of the connector sleeve 110 with a radial direction of the connector sleeve 110 as a reference.

The non-conductive film layer 130 is formed on an external circumferential surface of the connector sleeve 110 by being coated in a form of a thin film. The non-conductive film layer 130 is entirely coated on the cylindrical external circumferential surface of the connector sleeve 110. The non-conductive film layer 130 is formed of a non-conductive material, for example, the material that does not conduct electricity, such as a polymer.

As shown in FIG. 4 and FIG. 5, when the connector sleeve 110 is inserted into the connector housing 210 of the second connector 200, such a non-conductive film layer 130 enters and fills a first void space 241 of a space between the connector sleeve 110 and the connector housings 210.

The film layer stopper 140 is provided at a rear end portion of the connector sleeve 110. The film layer stopper 140 is provided at the rear end portion of the connector sleeve 110 with an insertion direction of the connector sleeve 110 into the connector housing 210 as a reference. In other words, the film layer stopper 140 is provided at a side facing the first opening portion 111.

The film layer stopper 140 is formed to have an external diameter greater than an external diameter of the connector sleeve 110, protruding outward in the radial direction of the connector sleeve 110. The external diameter of the film layer stopper 140 has a greater value than an internal diameter of the connector housing 210.

When a portion (that is, stripping section) of the non-conductive film layer 130 is separated from the connector sleeve 110 by a film layer pusher 230 of the second connector 200, such a film layer stopper 140 becomes to close one side (that is, opening part) of the first void space 241 at a side facing the film layer pusher 230. As the film layer stopper 140 closes the one side portion of the first void space 241, the stripping section 131 of the non-conductive film layer 130 separated from the external circumferential surface of the connector sleeve 110 is prevented from going to an outside of the first void space 241 to leak, and the first void space 241 becomes to be completely filled by the non-conductive film layer 130.

Here, the non-conductive film layer 130 may include the stripping section 131 and the non-stripping section 132. The stripping section 131 is a portion separated from the external circumferential surface of the connector sleeve 110 when the connector sleeve 110 is inserted into the connector housing 210. The non-stripping section 132 is a portion which is not separated from the external circumferential surface of the connector sleeve 110 when the connector sleeve 110 is inserted into the connector housing 210.

In a process the connector sleeve 110 is inserted into the connector housing 210, the stripping section 131 is separated from the external circumferential surface of the connector sleeve 110 by the film layer pusher 230 thereby moving toward the non-stripping section 132. The non-stripping section 132 maintains a state of being coated on the external circumferential surface of the connector sleeve 110 even after the connector sleeve 110 is inserted into the connector housing 210.

The connector cable 150 is an image transmission cable configured to transmit an image signal obtained through a camera and the like to a device such as an image receiver and the like. The connector cable 150 has one end portion fixedly supported to the rear end portion of the connector sleeve 110. The connector cable 150 is provided on the outside of the connector sleeve 110 and is connected thereto so that an image signal may be transmitted to the first connector terminal 120. The connector cable 150 may transmit an image signal to the first connector terminal 120. Although not shown in the drawings, the connector cable 150 may penetrate the rear end portion of the connector sleeve 110 in the axial direction thereof to be in contact with the first connector terminal 120.

As shown in FIGS. 1 and 3, the second connector 200 includes a connector housing 210, the second connector terminal 220, and the film layer pusher 230.

The connector housing 210 may be formed in a shape of cylinder including one end portion open and an opposite end portion closed. With a longitudinal direction of the second connector terminal 220 as a reference, the connector housing 210 is formed in a structure including one end portion open. The connector housing 210 has a second opening portion 211 at one end portion thereof for insertion of the connector sleeve 110.

The second connector terminal 220 is provided inside the connector housing 210. The second connector terminal 220 is provided inside the connector housing 210 in a state in which one side thereof is fixed to the connector housing 210. The second connector terminal 220 extends long in an axial direction of the connector housing 210. The second connector terminal 220 may be provided in a center portion of the connector housing 210 with a radial direction of the connector housing 210 as a reference.

Such a second connector terminal 220 is formed in a shape of cylinder into which the first connector terminal 120 may be inserted. When the first connector terminal 120 is inserted into the second connector terminal 220, coming into contact with the second connector terminal 220, an image signal transmitted to the first connector terminal 120 through the connector cable 150 may be transmitted from the first connector terminal 120 to the second connector terminal 220.

On the other hand, the connector housing 210 is formed to have an internal diameter greater than an external diameter of the connector sleeve 110 for easy fastening of the connectors 100 and 200. Furthermore, the internal diameter of the connector housing 210 is greater than an external diameter of the non-conductive film layer 130 coated on the external circumferential surface of the connector sleeve 110.

For example, when the external diameter of the connector sleeve 110 is 3.8 mm, the internal diameter of the connector housing 210 may be 6.7 mm, and the external diameter of the non-conductive film layer 130 may be determined to be greater than 3.8 mm and less than 6.7 mm. The external diameter of the non-conductive film layer 130 is determined according to a radial direction thickness (that is, coating thickness) of the non-conductive film layer 130, and a method of determining the radial direction thickness of the non-conductive film layer 130 will be described later.

As the internal diameter of the connector housing 210 is greater than the external diameter of the connector sleeve 110, when the connector sleeve 110 is inserted into the connector housing 210, a void space 240 is formed as a space between the internal circumferential surface of the connector housing 210 and the external circumferential surface of the connector sleeve 110.

The void space 240 may be divided into the first void space 241 and a second void space 242 through the film layer pusher 230.

The film layer pusher 230 is protrudingly provided on the internal circumferential surface of the connector housing 210. The film layer pusher 230 is extendedly seamlessly formed in the circumferential direction of the connector housing 210. The film layer pusher 230 is formed in an annular shape on the internal circumferential surface of the connector housing 210.

The film layer pusher 230 is protrudingly formed toward the second connector terminal 220 in the radial direction of the connector housing 210. The film layer pusher 230 is provided at a middle portion of the connector housing 210.

The film layer pusher 230 is integrally formed with the connector housing 210. Furthermore, the film layer pusher 230 may be formed of the same material as the connector housing 210. For example, the film layer pusher 230 may be formed of stainless material.

Such a film layer pusher 230 has an internal diameter smaller than the external diameter of the non-conductive film layer 130 to relatively push the stripping section 131 of the non-conductive film layer 130 when the connector sleeve 110 is inserted into the connector housing 210. That is, the internal diameter of the film layer pusher 230 is smaller than the external diameter of the non-conductive film layer 130.

The film layer pusher 230 is formed to have a minimum radial direction width to minimize mechanical interference with the connector sleeve 110 while provided as a guide for the connector sleeve 110 when the first connector 100 and the second connector 200 are fastened to each other. Furthermore, the film layer pusher 230 is formed to have a minimum clearance with the connector sleeve 110 to facilitate filling of the non-conductive film layer 130 into the first void space 241. The radial direction width is referred with the radial direction of the connector housing 210 as a reference.

The radial direction width of the film layer pusher 230 may be smaller than the radial direction width of the first void space 241. For example, when the radial direction width of the first void space 241 is 1.2 mm, the radial direction width of the film layer pusher 230 may be 1.0 mm. At the instant time, the connector sleeve 110 and the film layer pusher 230 have a clearance of 0.2 mm.

The first void space 241 is provided in front of the film layer pusher 230, and the second void space 242 is provided at a rear of the film layer pusher 230, with the direction in which the connector sleeve 110 is inserted into the connector housing 210 as a reference, the first void space 241 is provided in the front of the film layer pusher 230, and the second void space 242 is provided at the rear of the film layer pusher 230. To describe in more detail, the first void space 241 is a gap portion between the second opening 211 of the connector housing 210 and the film layer pusher 230.

When the film layer pusher 230 and the non-conductive film layer 130 start to come into contact with each other when the connector sleeve 110 is inserted into the connector housing 210, the film layer pusher 230 blocks the entry of the non-conductive film layer 130. Accordingly, the film layer pusher 230 is configured to relatively push away the stripping section 131 of the non-conductive film layer 130 when the connector sleeve 110 is inserted into the connector housing 210.

The stripping section 131 of the non-conductive film layer 130 is separated from the external circumferential surface of the connector sleeve 110 while being pushed away by the film layer pusher 230 as the connector sleeve 110 enters the connector housing 210. The stripping section 131 of the non-conductive film layer 130 separated from the external circumferential surface of the connector sleeve 110 is moved toward the first void space 241 and fills the first void space 241 as shown in FIG. 4 and FIG. 5.

At the present time, the film layer stopper 140 prevents the stripping section 131 of the non-conductive film layer 130 from being leaked out of the first void space 241, allowing the first void space 241 to be completely filled by the non-conductive film layer 130.

When the first connector 100 and the second connector 200 are fastened together, the first void space 241 is completely filled with the non-conductive film layer 130, so that the clearance between the connector housing 210 and the connector sleeve 110 is eliminated, and radial direction movement of the connector sleeve 110 due to the clearance is prevented.

In a process in which the connector sleeve 110 is inserted into the connector housing 210 for fastening the first connector 100 and the second connector 200 to each other, the stripping section 131 of the non-conductive film layer 130 is separated from the external circumferential surface of the connector sleeve 110 and becomes to move to the first void space 241. At the instant time, the stripping section 131 of the non-conductive film layer 130 moved to the first void space 241 becomes to fill a space between an external circumferential surface of the non-stripping section 132, which remains in a state of being coated on the external circumferential surface of the connector sleeve 110, and the internal circumferential surface s of the housing 210. Accordingly, the first void space 241 becomes to be completely filled with the non-conductive film layer 130 when the fastening of the first connector 100 and the second connector 200 is completed.

To allow the first void space 241 to be completely filled with the non-conductive film layer 130 when the first connector 100 and the second connector 200 are fastened to each other, the radial direction thickness of the non-conductive film layer 130 is determined as in Equation 3 below. That is, a volume A1 of the first void space 241 is determined as shown in Equation 1 below, a volume A2 of the non-conductive film layer 130 required for filling the first void space 241 is expressed by Equation 2 below, and the required volume A2 of the non-conductive film layer 130 may be equal to the volume A1 of the first void space 241.

$$A1=\pi\times h'\times(a^2-b^2) \qquad \text{Equation 1:}$$

$$A2=2\pi\times b\times h\times t_{film}\div\text{filling-rate}_{film} \qquad \text{Equation 2:}$$

$$t_{film}=\{h'\times(a^2-b^2)\times\text{filling-rate}_{film}\}/(2\times b\times h) \qquad \text{Equation 3:}$$

With reference to FIG. 1, "h'" is a distance from the second opening portion 211 of the connector housing 210 to the film layer pusher 230, "a" is the internal diameter of the connector housing 210, and "b" is the external diameter of the connector sleeve 110, "h" is an axial direction length of the connector sleeve 110, and the $\text{filling-rate}_{film}$ is a filling-rate of the non-conductive film layer 130 to the first void space 241.

Some of the stripping section 131 of the non-conductive film layer 130 may not be separated from the connector sleeve 110 due to the clearance between the connector sleeve 110 and the film layer pusher 230, so that the $\text{filling-rate}_{film}$ value is adjusted so that the first void space 241 is completely filled with the non-conductive film layer 130.

As shown in FIG. 1, before the first connector 100 and the second connector 200 are fastened to each other, the radial direction thickness of the non-conductive film layer 130 has a value smaller than the radial direction width of the first void space 241. As shown in FIG. 4 and FIG. 5, after the first connector 100 and the second connector 200 are fastened to each other, the radial direction thickness of the non-conductive film layer 130 has the same value as the radial direction width of the first void space 241.

In the connector assembly for the video transmission cable of the present disclosure configured as described above, in the process that the connector sleeve 110 is inserted into the connector housing 210 for fastening the first connector 100 and the second connector 200 to each other, the first void space 241 is filled with the non-conductive film layer 130, and when the fastening of the first connector 100 and the second connector 200 to each other is completed, the first void space 241 is completely filled with the non-conductive film layer 130. Therefore, the clearance between the connector housing 210 and the connector sleeve 110 is eliminated.

As a result, the connector assembly for the video transmission cable may increase fastening robustness, and even when vibration and shock of a vehicle occur, the contact state of the connector terminals 120 and 220 is stably maintained, so that a transmission error of an image signal caused by the poor contact between the connector terminals 120 and 220 may be prevented.

Here, the second connector 200 may be a connector of an image receiver that receives an image signal transmitted from the connector cable 150 through the connector assembly as described above. The image receiver may output and store the received image signal. For example, the second connector 200 may be a female connector provided in the controller of the image receiver.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A connector assembly comprising:

a first connector provided with a connector sleeve, a first connector terminal provided inside the connector sleeve, and a non-conductive film layer coated on an external circumferential surface of the connector sleeve; and a second connector provided with a connector housing into which the connector sleeve is configured to be inserted, a second connector terminal provided inside the connector housing to come into contact with the first connector terminal, and a film layer pusher protrudingly formed on an internal circumferential surface of the connector housing, wherein, when the connector sleeve is inserted into the connector housing, a portion of the non-conductive film layer is separated from an external circumferential surface of the connector sleeve by the film layer pusher, filling a first void space of a space formed between the connector sleeve and the connector housing.

2. The connector assembly of claim 1, wherein the film layer pusher is provided at a middle portion of the connector housing in an axial direction of the connector housing, extending with a predetermined thickness in a circumferential direction of the connector housing.

3. The connector assembly of claim 2, wherein the first void space is a space formed between an opening portion of the connector housing and the film layer pusher.

4. The connector assembly of claim 2, wherein the film layer pusher has an internal diameter smaller than an external diameter of the non-conductive film layer.

5. The connector assembly of claim 2, wherein the space includes a second void space in an axial direction of the connector housing, and an end portion of the connector sleeve is positioned in the second void space when the connector sleeve is inserted into the connector housing.

6. The connector assembly of claim 2, wherein when the connector sleeve is inserted into the connector housing, the end portion of the connector sleeve is positioned in the second void space by passing the first void space and the film layer pusher in sequence.

7. The connector assembly of claim 6, wherein the first void space, the film layer pusher and the second void space are provided in series in an axial direction of the connector housing from an opening portion of the connector housing.

8. The connector assembly of claim 2, wherein the connector sleeve is provided with a film layer stopper at a rear end portion of the connector sleeve; and when a portion of the non-conductive film layer is separated from an external circumferential surface of the connector sleeve by the film layer pusher, the film layer stopper closes the first void space at a side facing the film layer pusher.

9. The connector assembly of claim 8, wherein the film layer stopper has an external diameter greater than an internal diameter of the connector housing.

10. The connector assembly of claim 8, wherein the film layer stopper is formed to have an external diameter greater than an external diameter of the connector sleeve, protruding outward in a radial direction of the connector sleeve.

11. The connector assembly of claim 1, wherein the first connector includes a connector cable configured to transmit an image signal to the first connector terminal.

* * * * *